United States Patent
Zhou

(10) Patent No.: US 7,458,510 B1
(45) Date of Patent: Dec. 2, 2008

(54) AUTHENTICATION OF AUTOMATED VENDING MACHINES BY WIRELESS COMMUNICATIONS DEVICES

(75) Inventor: Tong Zhou, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 642 days.

(21) Appl. No.: 11/110,096

(22) Filed: Apr. 19, 2005

(51) Int. Cl.
*G06K 7/08* (2006.01)
(52) U.S. Cl. ............ 235/381; 235/379; 713/168; 713/170
(58) Field of Classification Search ............ 235/380, 235/381, 379
See application file for complete search history.

(56) References Cited

U.S. PATENT DOCUMENTS

| | | | | |
|---|---|---|---|---|
| 5,698,836 | A | 12/1997 | Fujioka | 235/492 |
| 6,116,505 | A * | 9/2000 | Withrow | 235/381 |
| 6,198,361 | B1 | 3/2001 | Arisawa | 332/115 |
| 6,223,291 | B1 * | 4/2001 | Puhl et al. | 726/28 |
| 6,345,762 | B1 * | 2/2002 | Mori | 235/381 |
| 6,446,049 | B1 * | 9/2002 | Janning et al. | 705/40 |
| 6,463,534 | B1 * | 10/2002 | Geiger et al. | 713/168 |
| 6,749,117 | B2 | 6/2004 | Nakabe et al. | 235/435 |
| 6,754,559 | B2 * | 6/2004 | Itako | 700/237 |
| 6,784,730 | B2 | 8/2004 | Arisawa | 329/311 |
| 7,200,362 | B2 * | 4/2007 | Muratsu | 455/41.2 |
| 2002/0073027 | A1 * | 6/2002 | Hui et al. | 705/40 |
| 2002/0138761 | A1 * | 9/2002 | Kanemaki et al. | 713/201 |
| 2002/0174336 | A1 * | 11/2002 | Sakakibara et al. | 713/172 |
| 2003/0236872 | A1 | 12/2003 | Atkinson | 709/223 |
| 2004/0122685 | A1 * | 6/2004 | Bunce | 705/1 |
| 2004/0128249 | A1 * | 7/2004 | Hoffman | 705/44 |
| 2005/0107076 | A1 * | 5/2005 | Tsuda et al. | 455/419 |
| 2007/0124211 | A1 * | 5/2007 | Smith | 705/21 |

FOREIGN PATENT DOCUMENTS

| | | | |
|---|---|---|---|
| GB | 2383176 | | 6/2003 |
| JP | 113252069 | | 9/1999 |
| JP | 2002150386 | A * | 5/2002 |
| JP | 200438843 | | 2/2004 |
| JP | 200494550 | | 3/2004 |

OTHER PUBLICATIONS

Euro Smart, European Smart Card Industry Association, Smart Card Presentation, (Mar. 28, 2005).
NNT Information Sharing Platform Laboratories, "*High-Speed Public-Key based Electronic Cash Using Contactless IC Cards Presentation*," (Mar. 2001).

* cited by examiner

*Primary Examiner*—Uyen-Chau N Le

(57) ABSTRACT

A wireless device includes a contactless communications facility such as a contactless Integrated Circuit (IC) card to engage in a transaction with a vending machine. The wireless device obtains credential information from the vending machine and authenticates the vending machine prior to consummation of the transaction. This authentication prevents the users of the wireless devices from transmitting sensitive information (such as credit card data) to the vending machine when the vending machine is in fact a rogue vending machine; i.e., one that purports to vend legitimate products or services but rather is surreptitiously configured to steal sensitive financial information from unsuspecting users.

12 Claims, 4 Drawing Sheets

AUTHENTICATION OF AUTOMATED VENDING MACHINES BY WIRELESS COMMUNICATIONS DEVICES

BACKGROUND

This invention relates generally to the field of methods and devices for conducting transactions with automated vending machines, kiosks, and the like, and more particularly to a method of authenticating a vending machine prior to consummation of the transaction.

It is known in the art to provide automated vending machines that vend various goods, such as foodstuffs and other consumer items such as phone cards, travelers checks, as well as services, such for example flight insurance, cash, etc. This disclosure uses the general term "vending machine" to mean any automated machine that provides any good or service to a customer in exchange for money, and is intended to cover conventional vending machines, automated kiosks, automated teller machines, and the like.

The art has proposed using contactless communications devices such as contactless Integrated Circuit (IC) cards and Radio Frequency Identification Devices (RFIDs) as a means for communication with a vending machine and exchanging payment information. Such devices can be embedded in other devices, such as wireless communications devices such as cellular telephones and personal digital assistants. See for example Atkinson, published US patent application 2003/0236872. Other references of interest include Japanese patent documents JP 2004-94550; JP 2004-38843, and JP 11-3-252069. Mackay's British patent application GB 2,383,176 describes a method of operation of a vending machine using a cellular phone.

Contactless IC cards are described in the patent and technical literature, see for example U.S. Pat. Nos. 6,784,730; 6,749,117; 6,198,361 and 5,698,836. Basically, such devices are based on a smart card integrated circuit which communicates with a remote scanner/reader over a radiofrequency interface (ISO 14443-x Standard). The cards must be in relatively close proximity (typically less than one foot) to the scanner/reader in order for communication to happen, as the reader supplies a low impedance electromagnetic field to generate a power supply for the integrated circuit and to support clock and data exchange over the RF interface. The reader performs a basic authentication process by which the card is authenticated, using either a symmetrical or asymmetrical authentication process. See e.g. JP 2004-38843. Contactless IC cards and the like have been suggested for various functions, such as car parking tickets, public transportation fare tickets, toll both collection, library cards, payphones, and various other retail and school applications.

When contactless IC cards are used for purchasing products or services from a vending machine, the cards are used to convey sensitive financial information, typically including a credit card number, expiration date and card holder name. If the vending machine is a trustworthy machine, there is generally no problem and the transaction may proceed without any problems.

However, the present inventor has appreciated that an automated vending machine can be a rogue machine and used to steal personal identification or credit card information. For example, if the machine looks like a real vending machine and functions to vend products, it may nevertheless be operated by an illegal enterprise that uses the vending machine transactions to obtain confidential financial information and subsequently use the information for illegal, unauthorized purposes. Hence, there is a need in the art for a vending machine and associated method by which the vending machine itself is authenticated prior to consummation of a vending machine transaction, e.g. prior to the transmission of financial information from the IC card to the vending machine. If the vending machine is not authentic (as determined by the authentication process), the user of the IC card can be notified and the vending process may be safely aborted. The present invention meets that need. The known prior art does not suggest performing an authentication process in which an IC card or other communication device performs an authentication of a vending machine.

SUMMARY

In a first aspect, a method is described for conducting a transaction between a wireless communication device, such as a cell phone, personal digital assistant, pocket personal computer, and the like, and a vending machine. Again, the term "vending machine" is intended to be interpreted to cover generally any automated machine for vending or providing goods or services with a consumer in exchange for payment, including ATMs, automated kiosks, conventional vending machines, etc.

The wireless communication device includes a first contactless communications means (e.g., RFID transponder or contactless IC card). The first contactless communication means communicates with a corresponding second contactless communication means (e.g., RFID transponder or contactless IC reader/scanner) that is included in the vending machine.

The method includes a step a) of performing an authentication of the vending machine using the contactless communications means of the wireless communications device and the vending machine. This step may include steps of exchanging challenge and response messages, wherein the contactless communications means in the vending machine provides a private key signature and a digital certificate. The authentication step further uses communications between the wireless communications device and a vending machine authentication server, via a radio access network connecting the wireless communication device and the vending machine authentication server. For example, the private key signature, challenge and digital certificate of the vending machine wireless communications means may be forwarded from the wireless communications device over a CDMA radio access network to a vending machine authentication server on the wireless service provider enterprise network, and the server provides an authentication response (e.g., authenticated or not authenticated) back to the wireless device using the radio access network.

The method further continues with a step b) of completing the transaction including the exchange of payment information if the authentication in step a) is successful.

In one embodiment, the first contactless communications means in the wireless communications device comprises a contactless IC card incorporated into the wireless communications device and wherein the second contactless communication means comprises a contactless IC card reader/scanner module.

In this embodiment, the authentication process of step a) may comprises the steps of: a) sending a challenge message from the IC card to the scanner module; b) the scanner responding to the challenge with a private key signature and a digital certificate; c) the wireless communications device forwarding the private key signature, challenge, and digital certificate over the radio access network to the vending machine authentication server; d) the vending machine authentication server performing a validation of the private key signature and digital certificate and sending a response to the wireless communications device over the radio access network; and e) forwarding the response from the vending machine authentication server to the IC card, wherein the IC card authenticates the scanner based on the response.

In another possible embodiment, the first and second communications means comprise RFID transponders. Still other communications means may be used for communication between the wireless communication device and the vending machine, e.g., devices compliant with the 802.11, WiFi, or Bluetooth standards. Other standards, now known or later developed may also be used, the details of this communication being not particularly important.

In another aspect, an improvement to a wireless communications device is provided. The wireless device includes a contactless means for communication with a vending machine. The improvement comprises providing in the wireless communications device a memory storing a set of instructions for execution in the wireless communications device wherein the wireless devices executes an authentication process with a vending machine authentication server connected to a radio access network to authenticate the vending machine.

In still another aspect, an improvement is provided to a wireless service provider having a network having one or more servers providing services for wireless devices subscribing to the wireless service provider. The improvement comprises providing a vending machine authentication server in communication with the network, wherein the server performs an authentication of vending machines in response to vending machine authentication messages received from the subscriber wireless devices.

In a preferred embodiment, the vending machine authentication server includes a memory storing machine readable instructions for comparing a private key signature and a digital certificate from a vending machine with entries in a database and responsively determining whether the vending machine is authentic.

DETAILED DESCRIPTION OF PREFERRED EMBODIMENT

Overview

Figure 1:
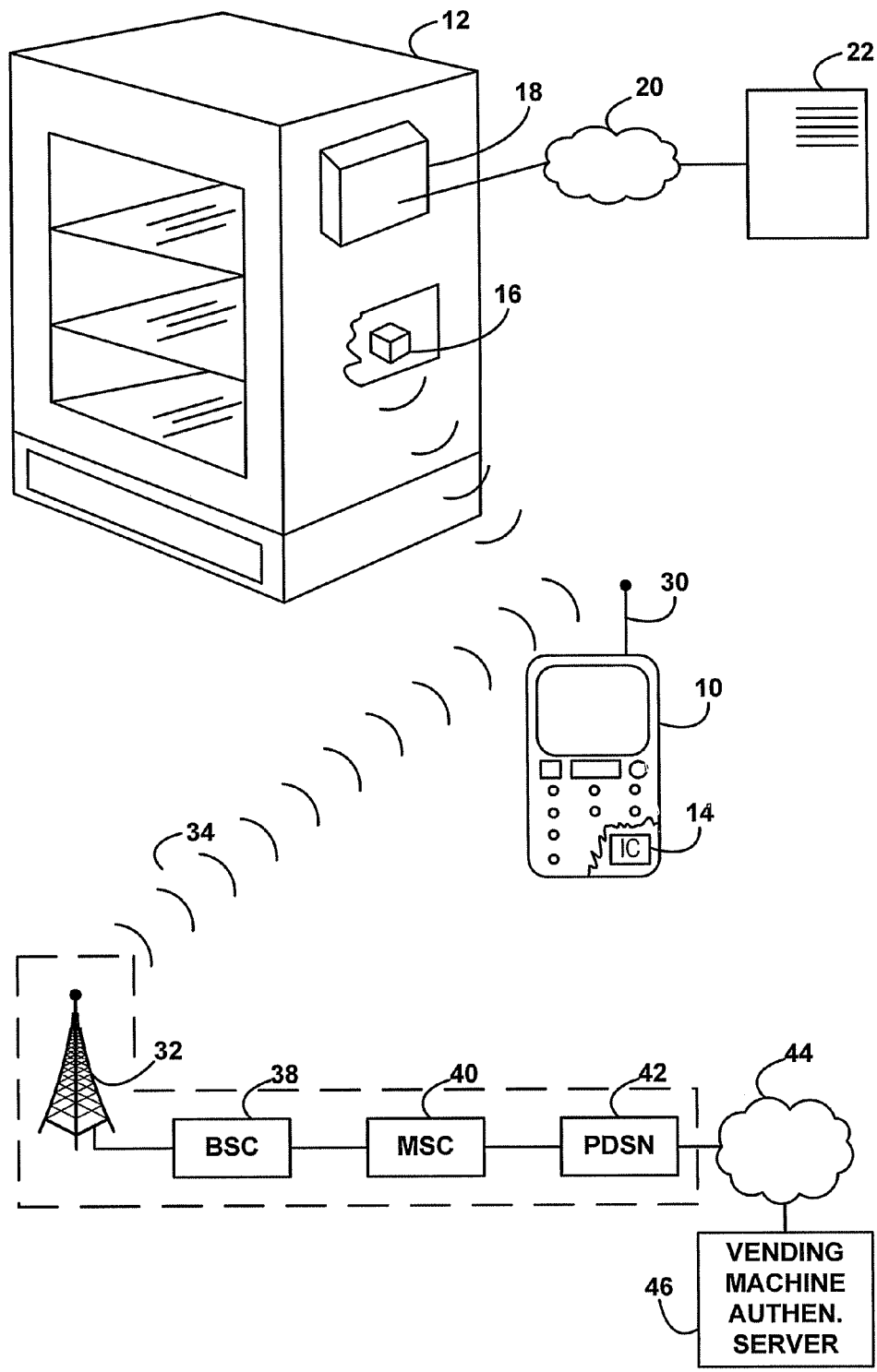
FIG. 1 is a schematic view of a wireless communications device that is used to conduct a transaction with a vending machine, and further illustrating a radio access network and vending machine authentication server which authenticates the vending machine for the wireless device.

FIG. 1 is a schematic view of a wireless communications device 10 that is used to conduct a transaction with a vending machine 12. The wireless communications device 10 includes a first contactless communications means 14 for communication with a corresponding second contactless communication means 16 included in the vending machine 12. The first contactless means 14 may take the form of a contactless IC card, RFID transponder, a transmitter/receiver in accordance with WiFi, Bluetooth, 802.11 or other standard, or other device either now known or later developed, the details of which are not particularly important. The second contactless communications means 16 is compatible with the contactless communications means 14 in the wireless communications device 10, and may take the form of a contactless IC scanner/reader (referred to herein interchangeably as "scanner" or "scanner module"), RFID transponder, etc.

The wireless communications device 10 may take the form of a cellular telephone, personal digital assistant, pocket PC, or other device. The wireless communication device 10 is capable of two types of wireless communications: 1) communications over an air interface 24 with the vending machine communications means 16 using the contactless communication device 14, and 2) communications over an air interface 34 with a vending machine authentication server 46 via a radio access network 36, which may in the illustrated example take the form of a conventional CDMA cellular telephone network.

Still referring to FIG. 1, the vending machine 12 includes a central control unit 18 which is shown connected via a local or wide area network 20 to a vending machine server 22. The vending machine server 22 is configured with software and interfaces to perform any of a variety of functions, including logging or facilitating transactions with the vending machine 12, authentication of devices (such as phone 10) engaging in transactions with the vending machine 12, etc.

The wireless device 10 in the illustrated, representative embodiment includes conventional cellular telephone transmission and receive circuitry connected to a cellular telephone antenna 30. The antenna 30 communicates with a CDMA base transceiver station antenna 32. The radio access network 36 includes the antenna 32, a base station controller 38, a mobile switching center MSC 40, and a packet data serving node (PDSN) 40 which may take the form of a remote access server that couples the radio access network 36 to a packet switched network 44. The network 44 may take the form of an Internet Protocol wide area network, and may include a wireless service provider enterprise network providing communications and data services for wireless service provider customers (subscribers), such as the user of the wireless device 10.

The network 44 will typically have a variety of network nodes for purposes of providing communications services to the wireless users (such as email storage, photo storage, call connection and forwarding). One of these services in the illustrated embodiment is vending machine authentication, a service provided by the vending machine authentication server 46. The manner in which these services are provided is described in further detail below.

Figure 2:
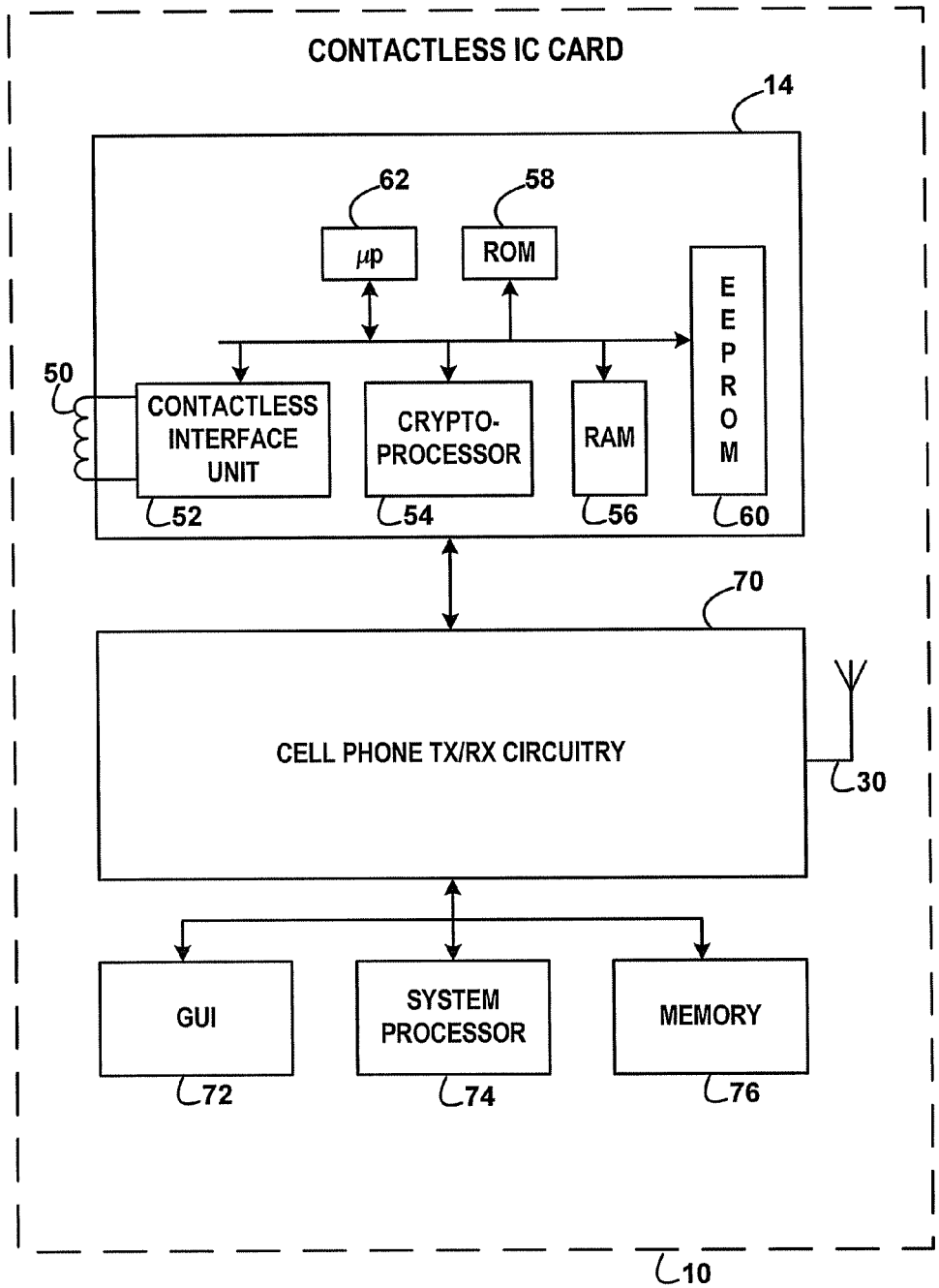
FIG. 2 is a simplified block diagram showing the wireless communications device of FIG. 1.

FIG. 2 is a simplified block diagram showing the wireless communications device 10 of FIG. 1. The device 10 includes a contactless IC card 14, and conventional cellular telephone circuitry represented by transmit/receive circuitry 70, graphical user interface module 72 for presentation of information on the display of the device 10 and receiving user input via the screen display or manual buttons or keys, a main system processor 74, and a memory 76 storing program instructions for execution by the system processor. The system processor 74 may be any state of the art processor commonly used for wireless devices including portable computers. The program instructions will typically include applications such as telephone and email applications, as well as web browser, entertainment or game applications, and vending machine applications wherein the device 10 is used for purchasing goods or services from vending machines, such as the vending machine 12 of FIG. 1. The details of modules 70, 72, 74 and 76 are not important and known in the art.

The contactless IC card 14 is likewise known in the art (see the previously cited patent literature, for example) and therefor a detailed description will be omitted from the present discussion. The card 14 may include an antenna 50 for RF inductive coupling to the scanner/reader 16 of the vending machine, a contactless interface unit 52 for demodulation and modulation of signals on the antenna 50, a crypto-processor for encryption and decryption of messages sent over the air interface with the IC scanner/reader, and memory devices 56, 58 and 60 for storing program instructions, data and device identification information. The card 14 will also typically include its own microprocessor 62 for executing program instructions allowing it to communicate with the IC scanner/reader 16 in the vending machine. The IC card or module 14 is placed in communication with the cell phone TX/RX circuitry 70 as shown in FIG. 2 in order for the device 10 to carry out the vending machine authentication steps on behalf of the IC card 14, as explained in further detail below.

Operation

Figure 3:
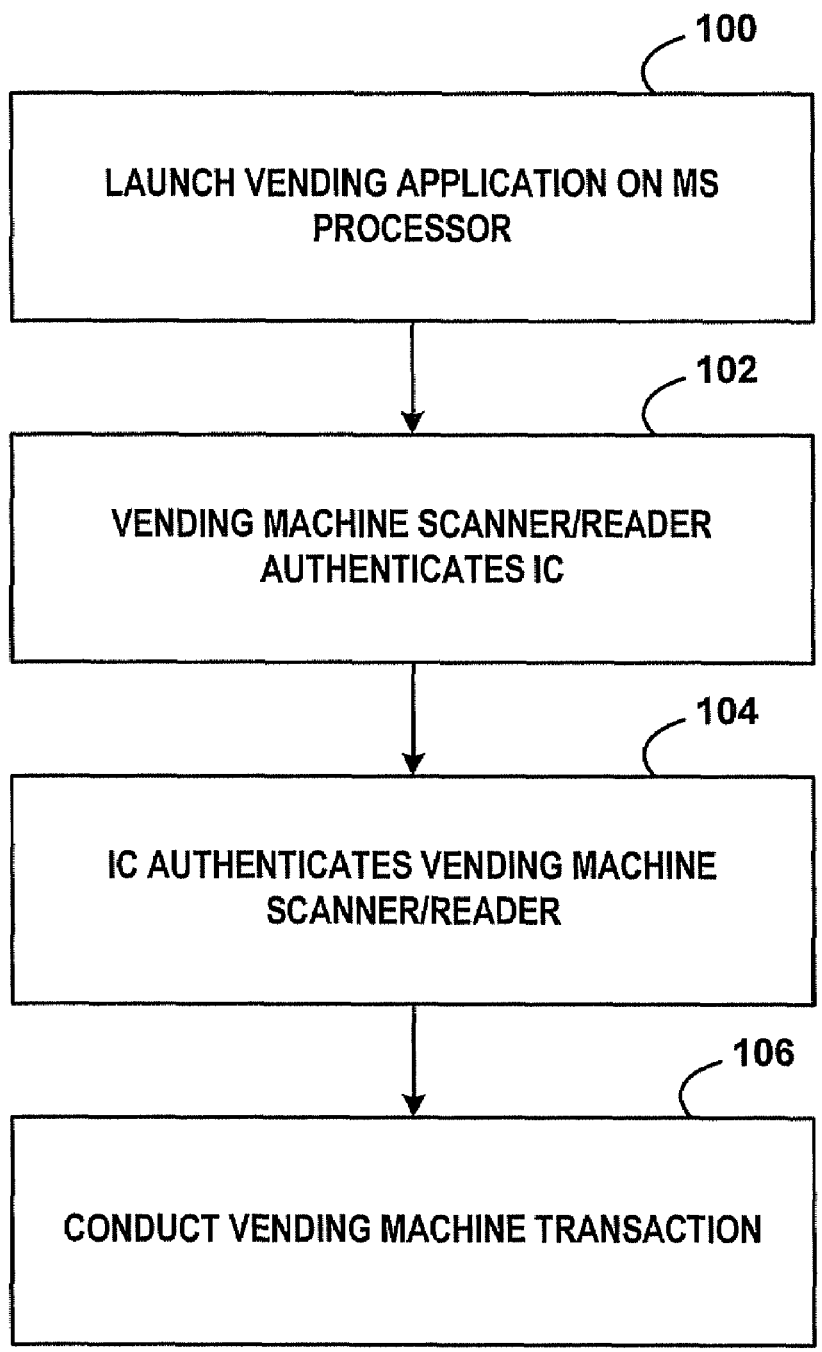
FIG. 3 is a flow chart showing a process for conducting a transaction between the wireless communications device and vending machine of FIG. 1.

With the above overview and explanation in mind, this discussion will now turn to an explanation of a process of conducting a vending machine transaction using the vending machine 12 and wireless communications device 10 of FIG. 1. FIG. 3 is a flow chart showing a preferred process. The vending machine authentication step 104 in FIG. 3 is explained in further detail in FIG. 4.

At step 100, the user of the wireless device 10 comes into close proximity with the vending machine and launches a vending machine application on the processor 74 of FIG. 2. The vending machine application presents to the user via the device 10 display various screen displays and prompts to facilitate a transaction with the vending machine. The transaction details are not important. Assume for purposes of this example that the vending machine is dispensing goods and the user obtains price information for the goods and is ready to make a purchase. The vending machine application may use the IC card 14 to obtain product information from the vending machine and present it on the display of the device 10.

At step 102, the vending machine scanner/reader 16 performs an authentication of the IC card 14. This may involve extraction of IC card identification by the reader 16, passing it to the central control unit 18 of the vending machine where the information is formatted into authentication packets and passed over network 20 to the vending machine server 22. The details by which the vending machine 12 may authenticate the wireless device/IC card 14 are not particularly important and may take advantage of proprietary methods unique to the IC card vendors, etc. The authentication at step 102 may be performed in any known manner, and may occur at the beginning of the transaction, or at the end.

At step 104, the wireless device 10 (and more specifically the IC card 14 in this example) authenticates the vending machine 12. The purpose of the vending machine authentication is to insure that the vending machine is not a rogue machine—i.e., that its credentials as a trustworthy machine can be verified. Step 104 can be performed in a variety of ways, a preferred method of which is described in FIG. 4 and explained subsequently. The vending machine authentication preferably involves obtaining vending machine credential information over the communications interface 22 (e.g., contactless IC), as well as the wireless device 10 making use of its ability to communicate with network entities connected to the network 44 via the radio access network 36. In particular, the wireless device 10 can obtain credential information (e.g., private key signature+digital certificate) from the vending machine in response to a challenge message and provide that information (signature, challenge and certificate) to the vending machine authentication server 46 on the network 44 for authentication. The server 46 compares the credential information with information of authorized vending machines stored in a database (or performs some other authorization routine). The server 46 provides an authentication response back to the wireless device 10 based on the authentication routine it performed. This information is passed to an authentication process running on the IC card 14.

At step 106, the vending machine transaction is allowed to proceed if the authentication is positive. For example, if the authentication from the server 42 indicates that the vending machine is "OK" (i.e., trustworthy), then the IC card can provide a prompt to the vending machine application indicating that the vending machine is approved and that completion of the transaction and transfer of sensitive payment information from the wireless device 10 to the vending machine 12 may safely proceed. Conversely, if the authentication at step 104 were to come out negative, the IC card 14 may provide a prompt to the vending machine application indicating that the vending machine is not authorized or approved, in which case the user of the device 10 can abort the transaction without any transfer of payment information (e.g., credit card number, expiration date, etc.).

Figure 4:
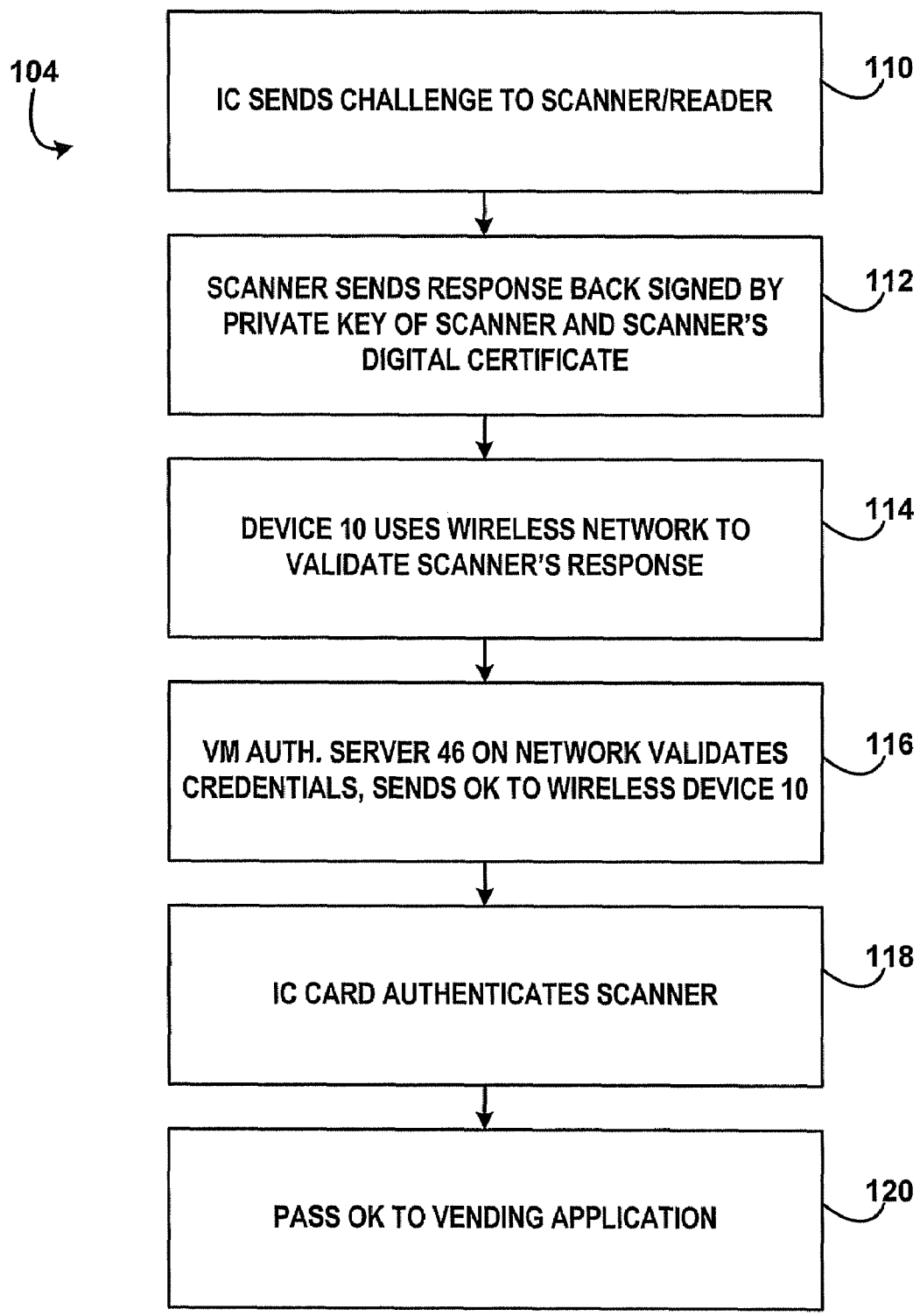
FIG. 4 is a flow chart showing the step of authentication of the vending machine in further detail in accordance with one possible embodiment of the invention.

FIG. 4 shows a representative example of a vending machine authentication step 104 in greater detail. At step 110, the IC card 14 sends a challenge message to the scanner/reader 16. At step 112, in response to the challenge message, the scanner/reader sends a response back. The response may take a variety of forms, one of which is in form a digital signature signed by private key of the scanner/reader plus the scanner/reader's digital certificate. The use of private keys signatures and digital certificates is believed known in the art and therefore a detailed description is not necessary.

At step 114, the wireless device forwards the vending machine scanner/reader 16 credential information over the radio access network 36 to the network 40 for transmission to the vending machine authentication server 46. This step may involve, for example, establishing a communications path between the device 10 and the radio access network 36, generation of an outgoing message in the TX/RX circuitry of the device 10, adding the credential information (private key signature, challenge and digital certificate) to payload fields for the message, adding a destination address of the vending machine authentication server 46 to a receiving address field in the message, and sending the message using known cellular telephone transmission methods.

At step 116, the vending machine authentication server 46 validates the credential information supplied from the wireless device 10. This may involve inspection of the credential data and comparing the data with credential data for authorized vending machines in a database accessible to the vending machine authentication server 46. The IC card 14 on the wireless device 10 and the authentication server 46 may share a secret to allow secure connection between the two entities. The vending machine authentication server validates the certificate and the signature of the vending machine scanner/reader 14. The vending machine authentication server then sends a vending machine authentication response back to the wireless device (e.g., an OK or NOT OK message).

At step 118, the TX/RX circuitry on the wireless communications device receives the authentication response and passes it to the IC card 14. The IC card 14 then authenticates the vending machine scanner/reader based on the response from the server 42.

At step 120, the response message from the vending machine authentication server 42 is passed to the vending machine application for display to the user. If the user sees a VENDING MACHINE NOT APPROVED response (or the like) displayed on the display of their device, they thus are notified of the security risk and able to abort the vending processing prior to transmission of sensitive financial or credit card information. If the message such as VENDING MACHINE APPROVED (or the like) is displayed, the user of the device 10 can proceed to complete the transaction. The user may further be able to set preferences in the vending machine application whereby any time a vending machine is not authenticated, the device automatically aborts the transaction.

Thus, from the foregoing, it will be appreciated that a method of conducting a transaction with a vending machine 10 has been described, including a step a) of performing an authentication of the vending machine using the contactless communications means 14, 16 of the wireless communications device and the vending machine, respectively. This step may include steps of exchanging challenge and response messages, wherein the contactless communications means in the vending machine provides a private key signature and a digital certificate. The authentication step further uses communications between the wireless communications device and a vending machine authentication server via a radio access network 36 connecting the wireless communication device and the vending machine authentication server 46. For example, the private key signature and digital certificate of the vending machine wireless communications means may be forwarded from the wireless communications device 10 over a CDMA radio access network 36 to a vending machine authentication server 46 on the wireless service provider enterprise network 44, and the server provides an authentication response (e.g., authenticated or not authenticated) back to the wireless device 10 using the radio access network 36.

The method further continues with a step b) of completing the transaction including the exchange of payment information if the authentication in step a) is successful.

In one embodiment, the first contactless communications means 14 in the wireless communications device comprises a contactless IC card incorporated into the wireless communications device and wherein the second contactless communication means 16 comprises a contactless IC card reader/scanner module.

In this embodiment, the authentication process of step a) may comprises the steps of: a) sending a challenge message from the IC card to the scanner module (110 in FIG. 4); b) the scanner responding to the challenge with a private key signature and a digital certificate (112); c) the wireless communications device forwarding the private key signature and digital certificate over the radio access network to the vending machine authentication server (114); d) the vending machine authentication server performing a validation of the private key signature and digital certificate and sending a response to the wireless communications device over the radio access network (116); and e) forwarding the response from the vending machine authentication server to the IC card, wherein the IC card authenticates the scanner based on the response (118).

In another possible embodiment, the first and second communications means comprise RFID transponders. Still other communications means may be used for communication between the wireless communication device and the vending machine, e.g., devices compliant with the 802.11, WiFi, or Bluetooth standards. Other standards, now known or later developed may also be used, the details of this communication being not particularly important.

In another aspect, an improvement to a wireless communications device 10 is provided. The wireless device includes a contactless means 14 for communication with a vending machine 12. The improvement comprises providing in the wireless communications device a memory 76 storing a set of instructions for execution in the wireless communications device (e.g., on processor 74 or on processor 62) wherein the wireless devices 10 executes an authentication process with a vending machine authentication server 46 connected to a radio access network 36 to authenticate the vending machine 12.

In still another aspect, an improvement is provided to a wireless service provider having a network 44 having one or more servers providing services for subscriber wireless devices to the wireless service provider. The improvement comprises providing a vending machine authentication server 46 in communication with the network 40, wherein the server 46 performs an authentication of vending machines 12 in response to vending machine authentication messages received from the subscriber wireless devices 10, as described above for example in FIGS. 1-4. The process described for the device 10 of FIG. 1 is preferably preformed in parallel for any number of subscriber devices.

In a preferred embodiment, the vending machine authentication server 46 takes the form of a general purpose computer platform and includes a memory storing machine readable instructions for comparing a private key signature and a digital certificate from a vending machine (or vending machine IC scanner/reader or other communications device) with entries in a database (not shown) and responsively determining whether the vending machine is authentic.

While presently preferred and alternative embodiments have been described, variation from the illustrated embodiments is possible without departure from the scope of the invention. This scope is to be determined by reference to the appended claims.

The invention claimed is:

1. A method of conducting a transaction between a wireless communication device and a vending machine, wherein the wireless communication device includes a first contactless communications means for communication with a corresponding second contactless communication means included in the vending machine, comprising the steps of:
a) performing an authentication of the vending machine using the contactless communications means of the wireless communications device and the vending machine, the authentication step further using communications between the wireless communications device and a vending machine authentication server via a radio access network connecting the wireless communication device and the vending machine authentication server wherein the authentication further includes transmission of authentication information received by the wireless communications device from the vending machine to the vending machine authentication server and receipt of a response from the vending machine authentication server; and
b) completing the transaction including the transmission of payment information from the wireless device to the vending machine if the authentication in step a) is successful.

2. The method of claim 1, wherein the first contactless communications means comprises a contactless IC card incorporated into the wireless communications device and wherein the second contactless communication means comprises a contactless IC card scanner module.

3. The method of claim 1, wherein step a) comprises the steps of:
   a) sending a challenge message from the wireless device to the vending machine;
   b) the vending machine responding to the challenge with a private key signature and a digital certificate;
   c) the wireless communications device forwarding the private key signature, challenge and digital certificate over the radio access network to the vending machine authentication server;
   d) the vending machine authentication server performing a validation of the vending machine and sending a response to the wireless communications device over the radio access network; and
   e) forwarding the response from the vending machine authentication server to the wireless device, wherein the wireless device authenticates the vending machine based on the response.

4. The method of claim 1, wherein the first and second communications means comprise devices selected from the group consisting of RFID transponders, devices compliant with a Bluetooth standard, and devices compliant with an IEEE 802.11 standard.

5. In a wireless communications device having a contactless means for communication with a vending machine, the improvement comprising:
   a memory storing a set of instructions for execution in the wireless communications device wherein the wireless devices executes an authentication process with a vending machine authentication server connected to a radio access network to authenticate the vending machine the authentication process further including transmission of authentication information received by the wireless communications device from the vending machine to the vending machine authentication server.

6. The improvement of claim 5, wherein the contactless means comprises a contactless IC card.

7. The improvement of claim 5, wherein the contactless means comprises an RFID transponder.

8. The improvement of claim 6, wherein the vending machine includes a scanner module for communication with the IC card in the wireless device, and wherein the instructions comprise a set of instructions for performing the following steps:
   a) sending a challenge message from the IC card to the scanner module;
   b) the scanner responding to the challenge with a private key signature and a digital certificate;
   c) the wireless communications device forwarding the private key signature, a challenge associated with the challenge message and digital certificate over the radio access network to the vending machine authentication server;
   d) the vending machine authentication server performing a validation of the private key signature and digital certificate and sending a response to the wireless communications device over the radio access network; and
   e) forwarding the response from the vending machine authentication server to the IC card, wherein the IC card authenticates the scanner based on the response.

9. The improvement of claim 5, wherein the wireless communications device comprises a processor for executing a vending machine application wherein goods or services may be purchased from the vending machine, and wherein the transmission of payment information from the wireless communications device to the vending machine is dependent upon a positive authentication of the vending machine from the vending machine authentication server.

10. In a wireless service provider having a network having one or more servers providing services for subscriber wireless devices to the wireless service provider, the improvement comprising:
   providing a vending machine authentication server in communication with the network, wherein the server performs an authentication of vending machines in response to vending machine authentication messages received from the subscriber wireless devices;
   wherein the authentication further includes transmission of authentication information received by the subscriber wireless devices from the vending machine to the vending machine authentication server and receipt of a response from the vending machine authentication server.

11. The improvement of claim 10, wherein the vending machine authentication server includes a memory storing machine readable instructions for comparing a private key signature and a digital certificate from a vending machine with entries in a database and responsively determining whether the vending machine is authentic.

12. The improvement of claim 10, wherein the vending machine authentication messages include a digital certificate and private key signature from the vending machine and a challenge from the wireless device that was sent to the vending machine to prompt the digital certificate and private key signature.

* * * * *